United States Patent
Li et al.

(10) Patent No.: US 11,917,057 B2
(45) Date of Patent: Feb. 27, 2024

(54) METHOD, DEVICE, AND APPARATUS FOR PROCESSING DISTRIBUTED DATA, AND MEDIUM

(71) Applicant: TENCENT TECHNOLOGY (SHENZHEN) COMPANY LIMITED, Guangdong (CN)

(72) Inventors: Maocai Li, Guangdong (CN); Zongyou Wang, Guangdong (CN); Hu Lan, Guangdong (CN); Yifang Shi, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 455 days.

(21) Appl. No.: 17/336,231

(22) Filed: Jun. 1, 2021

(65) Prior Publication Data
US 2021/0297242 A1 Sep. 23, 2021

Related U.S. Application Data

(63) Continuation of application No. PCT/CN2020/083475, filed on Apr. 7, 2020.

(30) Foreign Application Priority Data

Apr. 25, 2019 (CN) .......................... 201910340034.8

(51) Int. Cl.
*H04L 9/08* (2006.01)
*H04L 9/30* (2006.01)

(52) U.S. Cl.
CPC ................ *H04L 9/088* (2013.01); *H04L 9/30* (2013.01)

(58) Field of Classification Search
CPC .................................. H04L 9/088; H04L 9/30
See application file for complete search history.

(56) References Cited

U.S. PATENT DOCUMENTS

| 10,181,948 B1 | 1/2019 | Nenov et al. |
| 10,373,158 B1 * | 8/2019 | James .................... G06Q 40/04 |

(Continued)

FOREIGN PATENT DOCUMENTS

| CN | 106780033 A | 5/2017 |
| CN | 107038578 A | 8/2017 |

(Continued)

OTHER PUBLICATIONS

First Chinese Office Action issued in Application CN201910340034.8 dated Apr. 6, 2021, with concise English Translation, (6 pages).

(Continued)

*Primary Examiner* — Gary S Gracia
(74) *Attorney, Agent, or Firm* — ARENTFOX SCHIFF LLP (57) ABSTRACT

The present disclosure includes a method for processing distributed data. In the method, the distributed data of a first main body is obtained. The distributed data has a transfer identifier. The distributed data is transferred, in response to a second main body different from the first main body, to a management address based on the transfer identifier when the distributed data meets a first condition. The first condition is that the distributed data includes abnormal information. The distributed data transferred to the management address freezes transfer of the distributed data by the first main body.

20 Claims, 6 Drawing Sheets

Obtain distributed data having a transfer identifier — S101

A second main body different from a first main body transfers the distributed data to a management address based on the transfer identifier in a case that the distributed data meets a first condition — S102

(56) References Cited

U.S. PATENT DOCUMENTS

| | | | | |
|---|---|---|---|---|
| 10,380,594 | B1* | 8/2019 | Bayer | G06F 16/951 |
| 10,540,654 | B1* | 1/2020 | James | G06Q 20/223 |
| 2018/0253702 | A1 | 9/2018 | Dowding | |
| 2018/0349896 | A1* | 12/2018 | Arora | G06Q 20/3829 |
| 2019/0026821 | A1* | 1/2019 | Bathen | G06Q 40/00 |
| 2019/0205898 | A1* | 7/2019 | Greco | G06Q 20/389 |
| 2019/0297109 | A1* | 9/2019 | Guo | G06Q 20/3829 |
| 2019/0356473 | A1* | 11/2019 | Rosenoer | G06Q 20/065 |
| 2019/0370798 | A1* | 12/2019 | Hu | G06Q 20/389 |
| 2021/0297242 | A1* | 9/2021 | Li | H04L 9/14 |
| 2021/0406877 | A1* | 12/2021 | Wu | G06Q 20/4014 |

FOREIGN PATENT DOCUMENTS

| | | |
|---|---|---|
| CN | 108288222 A | 7/2018 |
| CN | 108416578 A | 8/2018 |
| CN | 108961030 A | 12/2018 |
| CN | 109087078 A | 12/2018 |
| CN | 110245182 A | 9/2019 |

OTHER PUBLICATIONS

Second Chinese Office Action Issued in Application CN201910340034.8 dated Jun. 16, 2021, with concise English Translation, (9 pages).
Written Opinion and International Search Report with English Translation dated Jun. 24, 2020.

* cited by examiner

METHOD, DEVICE, AND APPARATUS FOR PROCESSING DISTRIBUTED DATA, AND MEDIUM

RELATED APPLICATIONS

This application is a continuation of International Application No. PCT/CN2020/083475, entitled "DISTRIBUTED DATA PROCESSING METHOD, DEVICE, APPARATUS AND MEDIUM" and filed on Apr. 7, 2020, which claims priority to Chinese Patent Application No. 201910340034.8, entitled "METHOD, DEVICE, AND APPARATUS FOR PROCESSING DISTRIBUTED DATA, AND MEDIUM" and filed on Apr. 25, 2019. The entire disclosures of the prior applications are hereby incorporated by reference in their entirety.

FIELD OF THE TECHNOLOGY

The present disclosure relates to a distributed data processing technology, including a method, device, and apparatus for processing distributed data, and a medium.

BACKGROUND OF THE DISCLOSURE

Distributed data technology is a new distributed infrastructure and computing method that verifies and stores data by using a blockchain data structure, generates and updates data by using a distributed node consensus algorithm, ensures the security of data transmission and access by using a method of cryptology, and programs and operates data by using a smart contract formed by automation script code. Therefore, electronic data based on the distributed data processing technology has advantages such as being stable, being reliable, and being tamper-proof.

SUMMARY

The present disclosure includes a method, device, and apparatus for processing distributed data, and a non-transitory computer-readable storage medium, to transfer the distributed data to a management address when the distributed data meets a specific condition, so as to manage the distributed data.

An embodiment of the present disclosure provides a method for processing distributed data. In the method, the distributed data of a first main body is obtained. The distributed data has a transfer identifier. The distributed data is transferred, in response to a second main body different from the first main body, to a management address based on the transfer identifier when the distributed data meets a first condition. The first condition is that the distributed data includes abnormal information. The distributed data transferred to the management address freezes transfer of the distributed data by the first main body.

An embodiment of the present disclosure further provides a device for processing distributed data. The device includes processing circuitry that is configured to obtain the distributed data of a first main body, the distributed data having a transfer identifier. The processing circuitry is configured to transfer, in response to a second main body different from the first main body, the distributed data to a management address based on the transfer identifier when the distributed data meets a first condition. The first condition is that the distributed data includes abnormal information. The distributed data transferred to the management address freezes transfer of the distributed data by the first main body.

An embodiment of the present disclosure further provides a non-transitory computer-readable storage medium storing instructions which when executed by a processor cause the processor to process distributed data. The distributed data of a first main body is obtained. The distributed data has a transfer identifier. The distributed data is transferred, in response to a second main body different from the first main body, to a management address based on the transfer identifier when the distributed data meets a first condition. The first condition is that the distributed data includes abnormal information. The distributed data transferred to the management address freezes transfer of the distributed data by the first main body.

An embodiment of the present disclosure further provides an apparatus for processing distributed data, including: one or more processors; and one or more memories, storing computer-readable code, the computer-readable code, when run by the one or more processors, performing the method for processing distributed data described above.

For example in the method for processing distributed data according to the embodiments of the present disclosure, distributed data having a transfer identifier is obtained, the distributed data being owned by a first main body, and a second main body different from the first main body transfers the distributed data meeting a first condition to a management address based on the transfer identifier, so that after being transferred to the management address, the distributed data cannot be transferred by the first main body that owns the distributed data. Therefore, management of the distributed data by the second main body is realized, thereby improving the controllability and security of the distributed data.

BRIEF DESCRIPTION OF THE DRAWINGS

To describe the technical solutions of the embodiments of the present disclosure more clearly, the following briefly introduces the accompanying drawings for describing the embodiments. The accompanying drawings in the following description show only some embodiments of the present disclosure, and a person of ordinary skill in the art may still derive other drawings from these accompanying drawings.

DESCRIPTION OF EMBODIMENTS

Technical solutions of embodiments of the present disclosure are described below with reference to the accompanying drawings of the embodiments of the present disclosure. The described embodiments are exemplary embodiments rather than all the embodiments of the present disclosure. All other embodiments obtained by a person of ordinary skill in the art based on the embodiments of the present disclosure fall within the protection scope of the present disclosure.

The "first", the "second" and similar terms used in the present disclosure do not indicate any order, quantity or significance, but are used to only distinguish different components. Similarly, a similar term such as "include" or "comprise" means that an element or an item appearing in front of the term covers an element or an item and equivalents thereof listed behind the term, but does not exclude another element or item. A similar term such as "connect" or "connection" is not limited to a physical or mechanical connection, but may include an electrical connection, whether direct or indirect.

Flowcharts are used in the present disclosure for describing steps of a method according to the embodiments of the present disclosure. It is to be understood that, the foregoing or following steps are not necessarily strictly performed according to a specific order. On the contrary, the steps may be performed in a reverse order or simultaneously. Meanwhile, other operations may be also added to the processes, or one or more steps may be deleted from the processes.

Distributed data is electronic data that is stored and operated based on a distributed infrastructure and computing method, and has advantages such as being stable, being reliable, and being tamper-proof. Currently, electronic data based on a blockchain technology may be an implementation of the distributed data.

Blockchain technology is a fusion technology of a plurality of fields such as peer-to-peer communication, digital encryption, a multi-party collaborative consensus algorithm, and a distributed ledger, and has features such as being tamper-proof and data on a blockchain being traceable. The electronic data based on the blockchain technology can ensure that the data on the blockchain is credible and circulatable, thereby helping improve the operation efficiency and reduce service costs. Specifically, the electronic data based on the blockchain technology may mean that data is stored in a blockchain data structure. For example, the blockchain data structure storing the data may be understood as a shared ledger in which information related to the data is stored.

Based on the description above, the blockchain technology is applicable to an application scenario such as multi-party participating supply chain finance. For example, the blockchain technology is applicable to a bill service application scenario. That is, the blockchain technology can be used to implement operations such as invoice issuing, storage, and circulation of an electronic bill. In other words, the blockchain technology can be used to implement a bill service. For example, the electronic bill may be an electronic invoice. In this disclosure, the electronic bill based on the blockchain technology may be referred to as a blockchain electronic bill. The electronic data based on the blockchain technology may be alternatively data other than the electronic bill. The electronic bill is only an example of the electronic data.

In the foregoing bill service application scenario, a related paper bill faces problems in aspects such as a complicated invoice issuing procedure and difficult bill storage. In addition, after the paper bill is issued, a supervision agency cannot track or control the circulation process of the paper bill at all. Compared with the paper bill, an electronic bill (e.g., an electronic invoice in a PDF format) has also been developed. However, the electronic bill also faces the problem that the supervision agency cannot track or control the circulation process of the bill. In other words, the circulation processes of the foregoing two bills are not under the supervision of any supervision agency. Comparatively, the electronic bill based on the blockchain technology, such as the blockchain electronic bill, provides a possibility of supervising the circulation process of the bill. The foregoing possibility of supervising the circulation process is also applicable to data based on the blockchain technology other than the blockchain electronic bill.

An embodiment of the present disclosure provides a method for processing distributed data, which may be used, for example, to manage the distributed data. The management may be, for example, management of distributed data that may be abnormal. Consequently, the distributed data cannot be operated temporarily.

As described above, the distributed data may be implemented by using the blockchain technology. For example, the distributed data may be a blockchain electronic bill. In an example, the electronic bill may be an electronic invoice. The blockchain electronic bill may be specifically a blockchain electronic invoice. In this disclosure, the method for processing distributed data according to the embodiments of the present disclosure is described using the blockchain electronic bill as the distributed data and with reference to an example of the blockchain electronic invoice.

For example, in the method for processing distributed data, the management of the distributed data may be a process as follows. When auditing or supervising the blockchain electronic bill, the supervision agency temporarily or permanently freezes some blockchain electronic bills whose transaction information is abnormal.

Figure 1A:
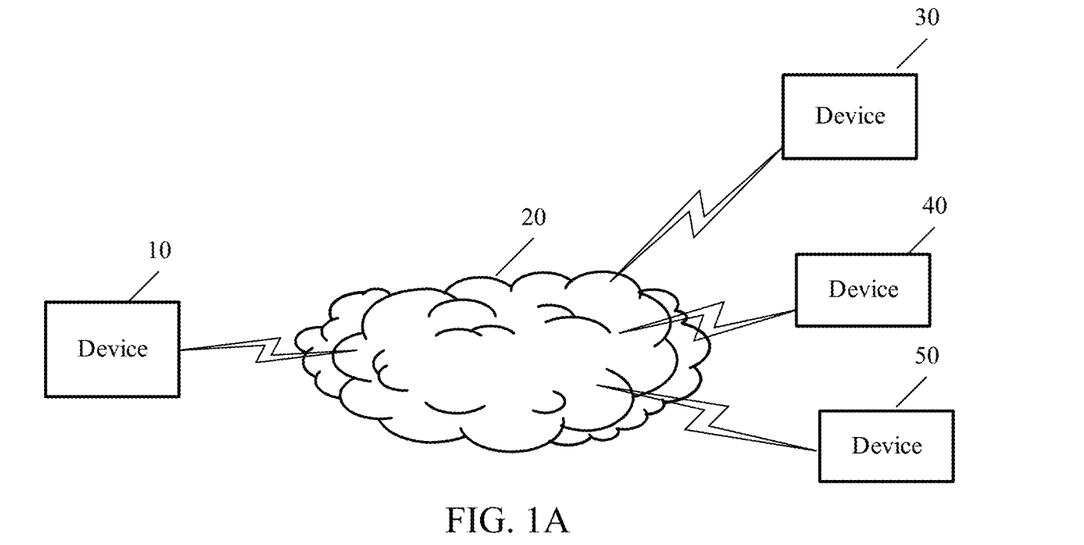
FIG. 1A is a schematic diagram of a system for processing distributed data according to an embodiment of the present disclosure.

FIG. 1A illustrates a system for processing distributed data according to an embodiment of the present disclosure. The system includes computing devices 10, 30, 40, and 50, and a communication network 20. The computing devices 10, 30, 40, and 50 may be servers, PCs, portable computing terminals, or the like. In each embodiment, one or more of the computing devices 10, 30, 40, and 50 are applicable to the method for processing distributed data according to the embodiments of the present disclosure.

Figure 1B:
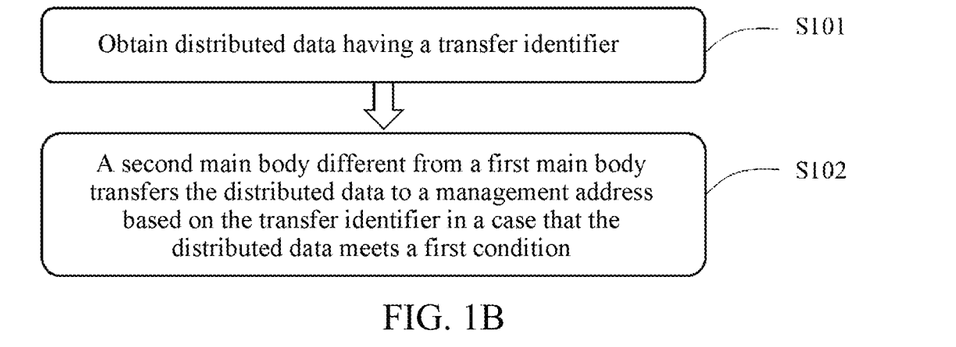
FIG. 1B is a flowchart of a method for processing distributed data according to an embodiment of the present disclosure.

FIG. 1B is a flowchart of a method for processing distributed data according to an embodiment of the present disclosure. The distributed data may be the blockchain electronic bill described above, and the processing may be managing the blockchain electronic bill. The distributed data may alternatively be data of another type. This method may be performed by one of the computing devices 10, 30, 40, and 50 shown in FIG. 1A.

As shown in FIG. 1B, in step S101, distributed data having a transfer identifier is obtained. According to the embodiments of the present disclosure, the distributed data may be owned by a first main body. The distributed data may be used as an electronic asset belonging to an owner of the electronic asset. For example, in step S101, a blockchain electronic bill having a transfer identifier may be obtained.

The blockchain electronic bill is owned by the first main body. A first main body, as an owner of a specific blockchain electronic bill, has ownership of the blockchain electronic bill, and may perform disposition on the blockchain electronic bill such as transfer. For example, the first main body may be an individual user, an enterprise, a service provider, or the like who uses the blockchain electronic bill. For example, the service provider may be an agency for providing a service based on the blockchain technology.

In step S102, a second main body different from the first main body transfers the distributed data to a management address based on the transfer identifier in a case that the distributed data meets a first condition. According to the embodiments of the present disclosure, the first condition may be that transaction information of the distributed data is abnormal. That is, the distributed data is transferred to the management address based on the transfer identifier in a case that the transaction information of the distributed data is abnormal.

According to the embodiments of the present disclosure, the distributed data may be transferred to the management address by the second main body different from the first main body. For the blockchain electronic bill, the second main body different from the first main body may be, for example, an agency having a supervision function on the blockchain electronic bill, for example, a supervision agency, an auditing agency, or a bank. The agency having the supervision function such as the supervision agency may manage the blockchain electronic bill, but does not have ownership of the blockchain electronic bill. The management address may correspond to the supervision agency, and the supervision agency manages, based on the management address, the blockchain electronic bill that meets the first condition. Further, the process of transferring, by the second main body, the distributed data to a management address based on the transfer identifier does not require agreement of the first main body as the owner.

The blockchain electronic bill is used as an example. The first condition may be that the blockchain electronic bill has abnormal transaction information. In this example, a case that the blockchain electronic bill meets the first condition may be that the supervision agency, the auditing agency, the bank, or the like determines that the blockchain electronic bill has the abnormal transaction information. The abnormal transaction information may be determined according to a specific application scenario, but the present disclosure is not limited thereto. For example, for an enterprise with a turnover of RMB 10000 yuan in a single day, if a blockchain electronic invoice with a denomination of 1 million is issued in a single day, it can be determined that the blockchain electronic invoice has abnormal transaction information. In another example, for an enterprise having a volume of transactions of 200 in a single day, normally, the number of blockchain electronic invoices of the enterprise is 200 in a single day. If the enterprise issues 1000 blockchain electronic invoices in a specific day, it can be determined that the 1000 blockchain electronic invoices have abnormal transaction information. In another example, if a specific blockchain electronic bill is frequently transferred in a short time, it can be also determined that the blockchain electronic bill has abnormal transaction information. As described above, the abnormal cases may be determined according to specific application scenarios, and are not described one by one by using examples.

According to the embodiments of the present disclosure, the distributed data transferred to the management address is unable to be transferred by the first main body. In other words, after the distributed data is transferred to the management address, the distributed data is controlled by the second main body. Although the distributed data is still owned by the first main body, the first main body as the owner cannot perform a further operation on the distributed data, until the second main body transfers the distributed data out of the management address.

For example, when determining that a specific blockchain electronic bill has abnormal transaction information, the supervision agency as the second main body may transfer the blockchain electronic bill to the management address to supervise and control the blockchain electronic bill. The management address is only used for controlling the blockchain electronic bill, and the owner of the blockchain electronic bill is still the first main body.

According to an embodiment of the present disclosure, the transfer identifier of the distributed data may be a multi-signature address created based on a first key pair corresponding to the first main body and a second key pair corresponding to the second main body. For example, the multi-signature address is created based on a public key in the first key pair and a public key in the second key pair.

The first key pair may include the public key and a private key, and may correspond to the first main body, for example, the owner. The second key pair may include the public key and a private key, and may correspond to the second main body, for example, the supervision agency.

The blockchain electronic bill is used as an example below for describing the key pairs and the multi-signature address that is created based on the first key pair and the second key pair.

A public key in a key pair may be used as an identity of a main body. For example, the public key in the first key pair corresponding to the first main body may identify identity information of the first main body. Similarly, the public key in the second key pair corresponding to the second main body may identify identity information of the second main body. The public key may be used for creating a signature address. In an application scenario of an electronic bill, for example, the public key in the first key pair corresponding to the first main body may create a signature address corresponding to the first main body. The signature address may be understood as, for example, an account having a signature of the first main body. When a blockchain electronic bill needs to be created, the first main body may transfer a bill asset to the signature address created by using the public key of the first main body, to generate a blockchain electronic bill corresponding to the bill asset, and an owner of the blockchain electronic bill is the first main body. Another main body in the blockchain, for example, the second main body, may identify the owner of the blockchain electronic bill according to the signature address of the blockchain electronic bill, that is, the first main body. Similarly, the public key in the second key pair corresponding to the second main body may be used for creating a signature address corresponding to the second main body.

The private key in the key pair may be used for transferring the blockchain electronic bill corresponding to the signature address created by using the public key in the key pair. For example, the first main body may create a signature address A by using the public key in the first key pair, and transfer the bill asset to the signature address A by using the private key in the first key pair.

In the foregoing embodiments according to the present disclosure, to supervise the blockchain electronic bill, the public key in the first key pair corresponding to the first main body and the public key in the second key pair corresponding to the second main body may be used for creating the multi-signature address. In an example, the public key in the first key pair may be used for creating a first signature address, the public key in the second key pair may be used for creating a second signature address, and the multi-signature address is created by using the first signature address and the second signature address. For an electronic bill transferred to the multi-signature address, for example, a bill asset, any party of the first main body and the second main body may transfer the electronic bill by using the private key of the party without agreement of the other party.

For a blockchain electronic bill corresponding to the multi-signature address, another main body in the blockchain may identify identity information of the first main body and identity information of the second main body according to the multi-signature address. In this disclosure, the first main body may refer to the owner of the blockchain electronic bill, and the second main body refers to a main body for managing the blockchain electronic bill, for example, the supervision agency. That is, the second main body does not have the ownership of the blockchain electronic bill.

In the foregoing embodiments according to the present disclosure, when the blockchain electronic bill does not meet the first condition, for example, the blockchain electronic bill does not have the abnormal transaction information, the first main body may operate the blockchain electronic bill by using the private key in the first key pair corresponding to the first main body. For example, the blockchain electronic bill is transferred to another owner (e.g., a second owner), and after a transfer operation is completed, a multi-signature address corresponding to the second main body and the second owner is created. In addition, transaction information related to the transfer operation is also stored in the blockchain data structure.

In the foregoing embodiments according to the present disclosure, the transferring the distributed data to a management address based on the transfer identifier may include: transferring the distributed data to the management address based on the multi-signature address by using a private key in the second key pair. For example, after it is determined that the blockchain electronic bill meets the first condition (e.g., has the abnormal transaction information), the second main body may transfer the blockchain electronic bill to the management address based on the multi-signature address by using the private key in the second key pair. The blockchain electronic bill transferred to the management address is unable to be transferred by the first main body. In the application scenario of the electronic bill, the operation of transferring the blockchain electronic bill to the management address may be understood as freezing the blockchain electronic bill.

In the foregoing embodiments according to the present disclosure, the distributed data is transferred out of the management address in a case that it is determined that the distributed data meets a second condition. For example, after the blockchain electronic bill is transferred to the management address, the second main body may further transfer the blockchain electronic bill out of the management address in a case that it is determined that the blockchain electronic bill meets the second condition. For example, the second main body may transfer the blockchain electronic bill back to the multi-signature address by using the private key in the second key pair. After transferring the blockchain electronic bill to the multi-signature address, the first main body as the owner of the blockchain electronic bill may continue to operate the blockchain electronic bill. In the application scenario of the electronic bill, the operation of transferring the blockchain electronic bill out of the management address may be understood as unfreezing the blockchain electronic bill.

Examples of the second condition are described below with reference to the blockchain electronic bill. For example, after transferring the blockchain electronic bill to the management address, the second main body may further determine the blockchain electronic bill, for example, perform in-depth examination for the abnormal transaction information. After it is determined that the blockchain electronic bill may continue to be circulated, the second main body may transfer the blockchain electronic bill out of the management address. The second condition may be that the blockchain electronic bill does not have the abnormal transaction information. In other words, the first condition may be that, for example, the supervision agency determines that the blockchain electronic bill has suspicious transaction information, that is, is likely to have the abnormal transaction information. In this case, the second main body transfers the blockchain electronic bill to the management address for freezing. After transferring the blockchain electronic bill to the management address, the second main body may further review the suspicious transaction information. If determining that the suspicious transaction information is not the abnormal transaction information, the second main body may transfer the blockchain electronic bill out of the management address for unfreezing.

In addition, the second condition may be further determined according to a specific application scenario. For example, the second condition may be that the blockchain electronic bill no longer meets a freezing condition. For example, for the blockchain electronic bill transferred to the management address, the supervision agency still cannot determine whether the blockchain electronic bill really has the abnormal transaction information within a period of time, for example, 48 hours. In this case, it can be determined that the blockchain electronic bill no longer meets the freezing condition, and the second main body may transfer the blockchain electronic bill out of the management address. The first condition and the second condition may be correspondingly set according to a specific application scenario, but the present disclosure is not limited thereto.

Figure 2A:
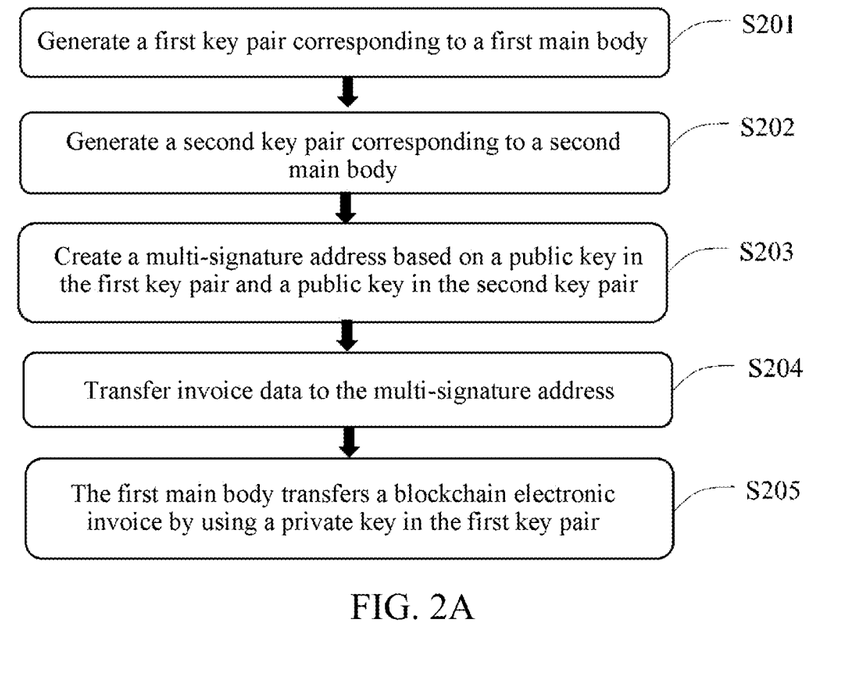
FIG. 2A is a flowchart of creating and transferring a blockchain electronic invoice according to an embodiment of the present disclosure.
Figure 2B:
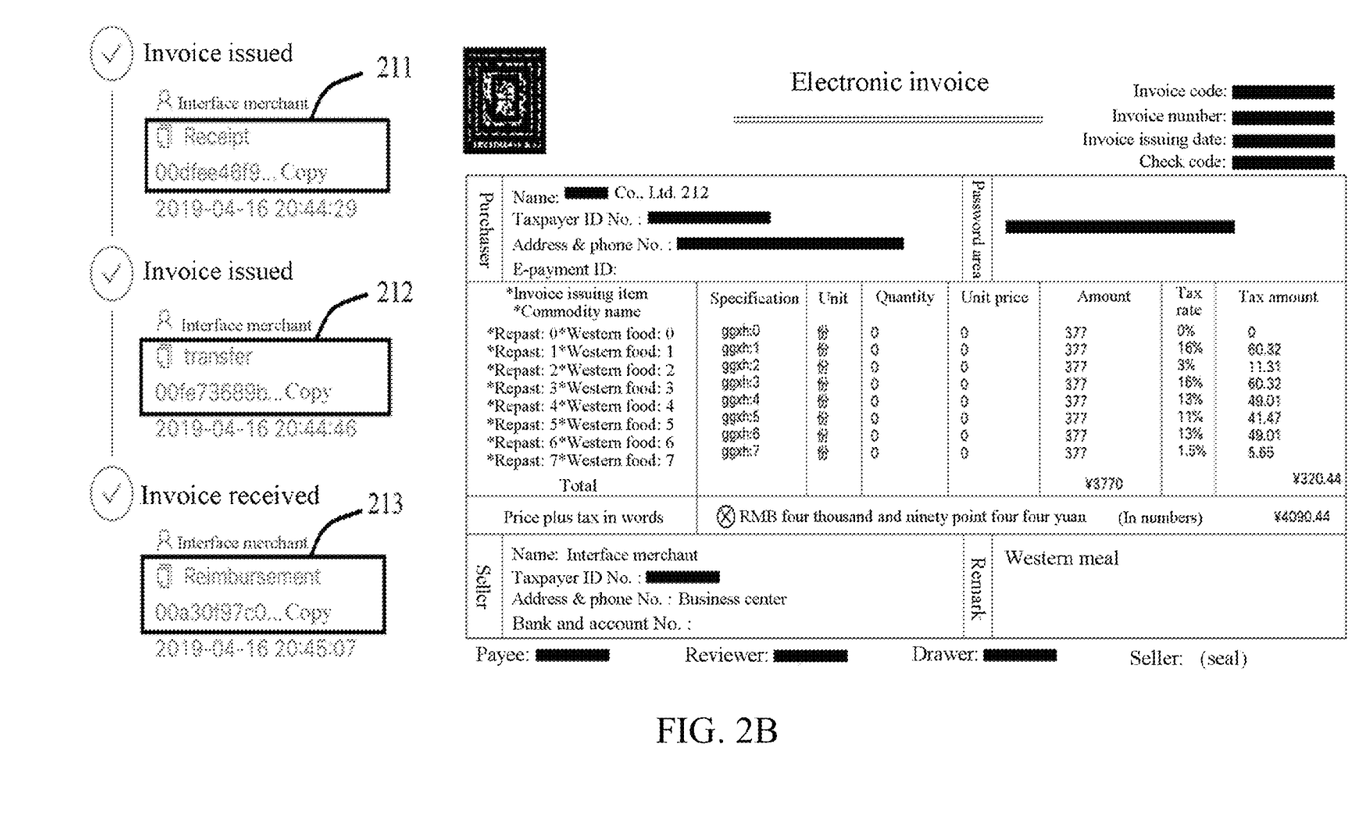
FIG. 2B is a schematic diagram of a blockchain electronic invoice and a transfer process of the blockchain electronic invoice according to an embodiment of the present disclosure.

FIG. 2A is a flowchart of creating and transferring a blockchain electronic invoice according to an embodiment of the present disclosure. FIG. 2B is a schematic diagram of a blockchain electronic invoice and a transfer process of the blockchain electronic invoice according to an embodiment of the present disclosure. The blockchain electronic invoice is used as an example below for further describing the method according to the embodiments of the present disclosure with reference to FIG. 2A and FIG. 2B. The method is further applicable to another application scenario, for example, the field of supply chain finance such as encrypted data or transaction deposit certificate, or the field related to artificial intelligence.

First, in step S201, a first key pair corresponding to a first main body is generated. In step S202, a second key pair corresponding to a second main body is generated. For example, the owner corresponding to the first main body may be registered on a blockchain. That is, information of the owner including the identity information is stored in the blockchain data structure. Then, a first key pair that includes a public key and a private key and that corresponds to the owner may be generated. The owner may submit the public key in the first key pair of the owner to an agency for creating signature addresses, to create a signature address. In addition, a supervision agency corresponding to the second main body may be further registered on the blockchain, and a second key pair that includes a public key and a private key and that corresponds to the supervision agency is generated.

In step S203, a multi-signature address may be created based on a public key in the first key pair and a public key in the second key pair. After the multi-signature address is created, the multi-signature address may be notified to the owner. The multi-signature address, as an account of the owner, is used for subsequent operations such as invoice collection and invoice issuing. Based on the multi-signature address, any party of the owner and the supervision agency may transfer the blockchain electronic invoice corresponding to the multi-signature address by using the private key of the party. Therefore, it may be implemented that when determining that the blockchain electronic invoice has the abnormal transaction information, the supervision agency may transfer the blockchain electronic invoice to the management address by using the private key of the supervision agency.

In step S204, the owner may transfer a bill asset to the multi-signature address by using the private key in the first key pair. That is, an invoice issuing operation is implemented. In step S205, the owner may transfer the blockchain electronic invoice based on the multi-signature address by using the private key in the first key pair. For the bill asset transferred to the multi-signature address, any party of the first main body and the second main body may transfer the bill asset by using the private key of the party without agreement of the other party. For example, the first main body as the owner may transfer the bill asset corresponding to the multi-signature address by using the private key in the first key pair without agreement of the second main body.

In FIG. 2B, a schematic diagram of an electronic invoice based on a blockchain technology, in this example, a blockchain electronic invoice is shown on a right side. As shown in FIG. 2B, information of the blockchain electronic invoice is displayed on the right side. For example, information such as a name, an address, and a phone number may be displayed, and content that is related to the invoice and that includes information such as a commodity name, a specification, a unit price, an amount, and a tax rate may be further specifically displayed.

In FIG. 2B, transfer information corresponding to the blockchain electronic invoice is shown on a left side. For example, information of the invoice as the bill asset is first created at an address 211 corresponding to the owner. The address may be a multi-signature address created jointly by using the public key of the owner and the public key of the supervision agency. The owner may transfer the information of the invoice to an address 212 corresponding to, for example, a consumer. The consumer may transfer the blockchain electronic invoice to, for example, an address 213 of an enterprise for reimbursement.

Figure 3:
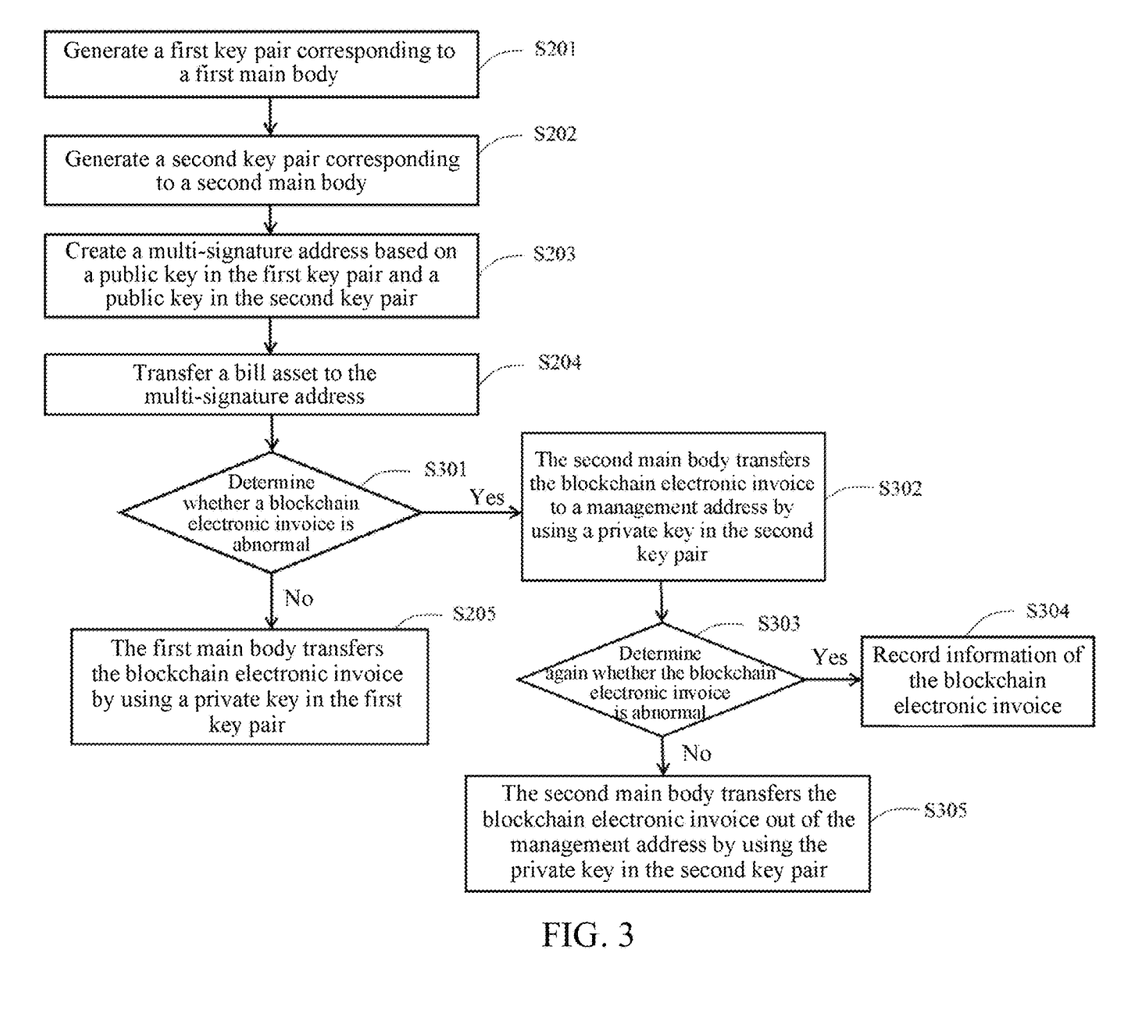
FIG. 3 is a flowchart of managing a blockchain electronic invoice according to an embodiment of the present disclosure.

FIG. 3 is a flowchart of managing a blockchain electronic invoice according to an embodiment of the present disclosure. The management may be, for example, transferring, by the foregoing supervision agency, the blockchain electronic invoice to the management address. As shown in FIG. 3, before the owner transfers the blockchain electronic invoice in step S205, whether the blockchain electronic invoice is abnormal is determined in step S301. The blockchain electronic invoice can be determined as abnormal based on whether the blockchain electronic invoice has abnormal transaction information. For example, the supervision agency, the bank, or the like may review the blockchain electronic invoice to determine whether the blockchain electronic invoice has the abnormal transaction information.

When it is determined that the blockchain electronic invoice does not have the abnormal transaction information, the owner performs step S205. For example, the owner transfers the blockchain electronic invoice by using the private key in the first key pair, as shown in FIG. 2B. For example, the owner may transfer the blockchain electronic invoice to the address 212 corresponding to, for example, the consumer, by using the private key of the owner.

When it is determined that the blockchain electronic invoice has the abnormal transaction information, step S302 may be performed. The supervision agency transfers, by using the private key in the second key pair, the blockchain electronic invoice having the abnormal transaction information to the management address, to freeze the blockchain electronic invoice, so that the owner of the blockchain electronic invoice cannot operate the blockchain electronic invoice. For example, after the blockchain electronic invoice is transferred to the management address, the owner cannot transfer the blockchain electronic invoice to the address 212 corresponding to, for example, the consumer, by using the private key of the owner, so that the owner of the blockchain electronic invoice cannot continue to transfer the blockchain electronic invoice.

In step S303, whether the blockchain electronic invoice is abnormal may be determined again. For example, as described above, the supervision agency may further examine the blockchain electronic invoice, and determine whether the blockchain electronic invoice needs to be unfrozen.

When it is determined that the blockchain electronic invoice has the abnormal transaction information, such as the blockchain electronic invoice does not meet an unfreezing condition, step S304 may be performed in which information of the blockchain electronic invoice is recorded for subsequent processing operations. Subsequent processing operations can include permanently freezing the blockchain electronic invoice for example.

When it is determined that the blockchain electronic invoice does not have the abnormal transaction information, step S305 may be performed. The supervision agency transfers the blockchain electronic invoice out of the management address by using the private key in the second key pair. For example, the supervision agency may transfer the blockchain electronic invoice back to the multi-signature address. The operation of transferring the blockchain electronic invoice out of the management address may be understood as unfreezing the blockchain electronic invoice.

According to another embodiment of the present disclosure, the transfer identifier of the distributed data may be a smart contract corresponding to the distributed data, and the second main body may transfer the distributed data to the management address based on the smart contract. The smart contract may be a program for implementing terms that both parties agree to follow. When the execution terms on which an agreement is reached are met, corresponding operations such as transfer may be automatically performed according to the smart contract.

A blockchain electronic bill is used as an example. The smart contract may be created as the transfer identifier of the blockchain electronic bill. The owner corresponding to the first main body may transfer the bill asset to a contract address corresponding to the smart contract, to generate the blockchain electronic bill. After the owner transfers the bill asset to the contract address corresponding to the smart contract, it is considered that the owner is willing to follow the terms on which an agreement is reached in the smart contract.

For example, in the smart contract, an agreement can be reached as follows: When the blockchain electronic bill has the abnormal transaction information, the supervision agency corresponding to the second main body transfers the blockchain electronic bill. For example, according to the smart contract, when the blockchain electronic bill has the abnormal transaction information, the supervision agency may directly transfer the blockchain electronic bill to the management address, to freeze the blockchain electronic bill, thereby supervising the blockchain electronic bill.

In another example, in the smart contract, an agreement can be reached as follows: When the blockchain electronic bill has the abnormal transaction information, the supervision agency corresponding to the second main body sets a freezing mark for the blockchain electronic bill. The freezing mark is used for freezing the blockchain electronic bill. For example, for a blockchain electronic bill having the freezing mark, an owner of the blockchain electronic bill cannot transfer the blockchain electronic bill.

The present disclosure provides a method for processing distributed data. It can be implemented by using the method according to the present disclosure that for distributed data having a transfer identifier, the distributed data that meets a first condition may be transferred to a management address based on the transfer identifier. The distributed data is owned by a first main body, and a second main body different from the first main body transfers the distributed data to the management address based on the transfer identifier. After the distributed data is transferred to the management address, an owner of the distributed data cannot transfer the distributed data. The transfer identifier may be the multi-signature address, or may be the smart contract. By setting the transfer identifier, the distributed data may be managed. When the first condition is met, a supervision agency corresponding to the second main body may directly transfer the distributed data to the management address, to freeze the distributed data, so that an owner corresponding to the first main body cannot continue to transfer the distributed data, until the supervision agency transfers the distributed data out of the management address. Therefore, the circulation process of the distributed data may be controlled. The distributed data in the present disclosure may be data based on a blockchain technology, for example, a blockchain electronic bill. By using the method according to the present disclosure, a capability of supervising the blockchain electronic bill and the like can be improved, and the security and stability of the blockchain electronic bill can be ensured.

Figure 4:
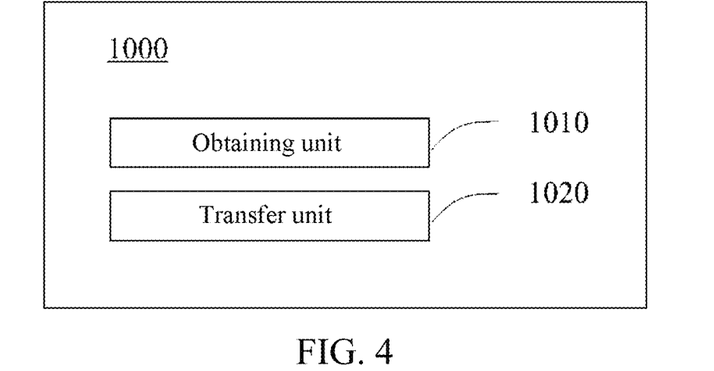
FIG. 4 is a schematic block diagram of a device for processing distributed data according to an embodiment of the present disclosure.

According to another aspect of the present disclosure, a device for processing distributed data is further provided. FIG. 4 is a schematic block diagram of a device for processing distributed data according to an embodiment of the present disclosure.

A shown in FIG. 4, the device 1000 for processing distributed data may include an obtaining unit 1010 and a transfer unit 1020. One or more of units of the device can be implemented by processing circuitry, software, or a combination thereof, for example. According to some embodiments of the present disclosure, the obtaining unit 1010 may be configured to obtain distributed data having a transfer identifier, the distributed data being owned by a first main body. The transfer unit 1020 may be configured to transfer the distributed data to a management address based on the transfer identifier in a case that the distributed data meets a first condition, the distributed data transferred to the management address being unable to be transferred by the first main body.

According to some embodiments of the present disclosure, the transfer identifier of the distributed data is a multi-signature address created based on a first key pair corresponding to the first main body and a second key pair corresponding to a second main body, the multi-signature address being created based on a public key in the first key pair and a public key in the second key pair.

According to some embodiments of the present disclosure, the transfer unit 1020 may transfer the distributed data to the management address based on the multi-signature address by using a private key in the second key pair.

According to some embodiments of the present disclosure, the first condition is that transaction information of the distributed data is abnormal.

According to some embodiments of the present disclosure, the transfer identifier of the distributed data is a smart contract corresponding to the distributed data, and the transfer unit 1020 may transfer the distributed data to the management address based on the smart contract.

According to some embodiments of the present disclosure, the transfer unit 1020 is further configured to transfer the distributed data out of the management address in a case that it is determined that the distributed data meets a second condition.

According to some embodiments of the present disclosure, the distributed data is owned by a first main body, and the distributed data transferred to the management address is unable to be transferred by the first main body.

Figure 5:
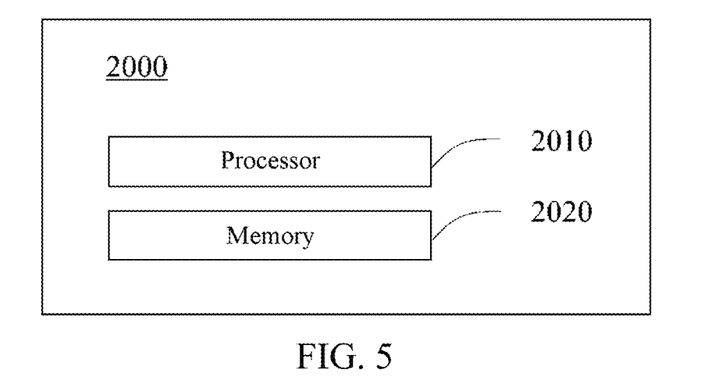
FIG. 5 is a schematic diagram of an apparatus for processing distributed data according to an embodiment of the present disclosure.

According to still another aspect of the present disclosure, an apparatus for processing distributed data is further provided. FIG. 5 is a schematic diagram of an apparatus 2000 for processing distributed data according to an embodiment of the present disclosure.

As shown in FIG. 5, the apparatus 2000 may include processing circuitry, such as one or more processors 2010, and one or more memories 2020. The memory 2020 stores computer-readable code or instructions. The computer-readable code, when run by the one or more processors 2010, may perform the method for processing distributed data described above.

Figure 6:
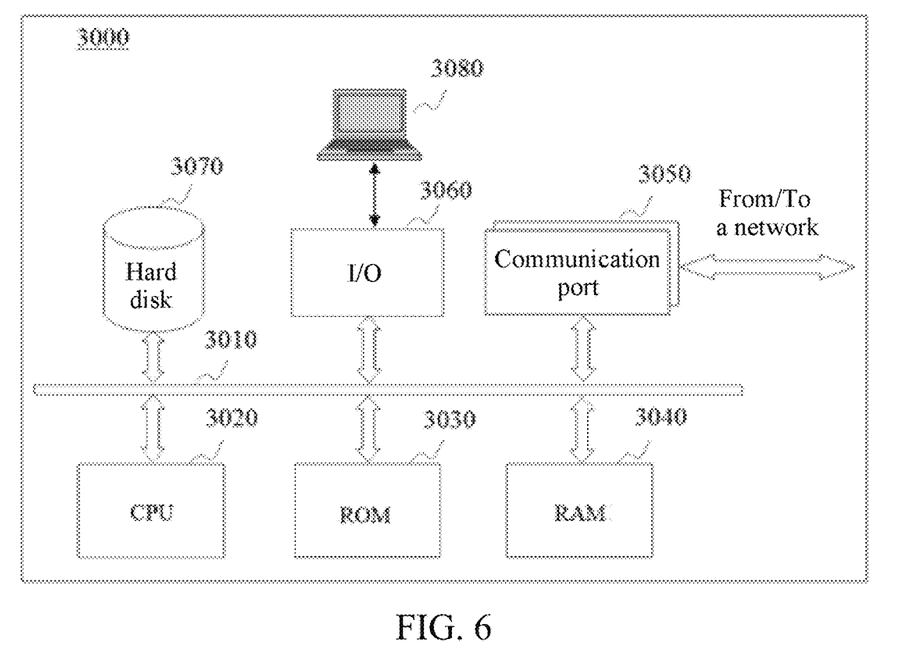
FIG. 6 is a schematic diagram of an architecture of an exemplary computing device according to an embodiment of the present disclosure.

The method or apparatus according to the embodiments of the present disclosure may alternatively be implemented by using an architecture of a computing device 3000 shown in FIG. 6. As shown in FIG. 6, the computing device 3000 may include a bus 3010, one or more CPUs 3020, a read-only memory (ROM) 3030, a random access memory (RAM) 3040, a communication port 3050 connected to a network, an input/output component 3060, a hard disk 3070, and the like. A storage device, for example, the ROM 3030 or the hard disk 3070, in the computing device 3000 may store various data or files used in processing and/or communication in the method for processing distributed data according to the present disclosure and program instructions executed by the CPU. The computing device 3000 may further include a user interface 3080. The architecture shown in FIG. 6 is only exemplary, and when different devices are implemented, one or more components in the computing device shown in FIG. 6 may be omitted according to an actual need.

Figure 7:
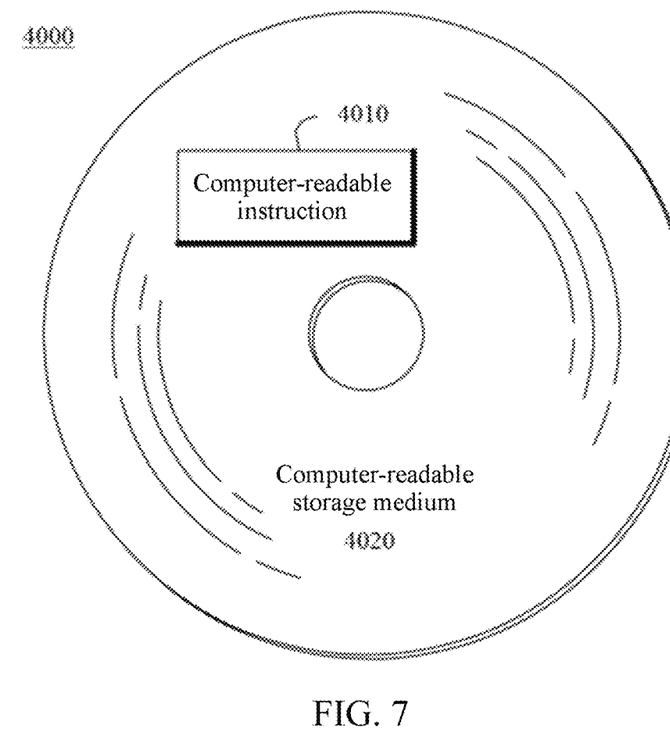
FIG. 7 is a schematic diagram of a storage medium according to an embodiment of the present disclosure.

According to still another aspect of the present disclosure, a computer-readable storage medium, such as a non-transitory computer-readable storage medium, is further provided. FIG. 7 is a schematic diagram 4000 of a storage medium according to the present disclosure.

As shown in FIG. 7, the computer storage medium 4020 stores computer-readable instructions 4010. The computer-readable instructions 4010, when executed by a processor, may perform the method for processing distributed data according to the embodiments of the present disclosure described with reference to the foregoing accompanying drawings. The computer-readable storage medium includes, but is not limited to, a volatile memory and/or a non-volatile memory. For example, the volatile memory may include a RAM and/or a cache. For example, the non-volatile memory may include a ROM, a hard disk, or a flash memory.

A person skilled in the art would understand that, content disclosed in the present disclosure may have various variations and improvements. For example, the devices or components described above may be implemented by using processing circuitry such as hardware, or may be implemented by using software, firmware, or a combination of some of or all of the software, the firmware, and the hardware.

In addition, although the present disclosure makes various references to some units in the system according to the embodiments of the present disclosure, any quantity of different units may be used and run on a client and/or a server. The units are only illustrative, and different aspects of the system and method may use different units.

A person of ordinary skill in the art may understand that all or some of the steps in the foregoing method may be implemented by a program instructing relevant hardware. The program may be stored in a computer-readable storage medium, for example, a ROM, a magnetic disk, or an optical disc. Optionally, all or some of the steps in the foregoing embodiments may be alternatively implemented by using one or more integrated circuits. The modules/units in the foregoing embodiments may be implemented in the form of hardware, or may be implemented in the form of a software functional module. The present disclosure is not limited to any specific form of combination of hardware and software.

Unless otherwise defined, all terms (including technical and scientific terms) used herein have the same meaning as commonly understood by one of ordinary skill in the art to which the present disclosure belongs. It is further to be understood that, the terms such as those defined in commonly used dictionaries are to be interpreted as having meanings that are consistent with the meanings in the context of the related art, and are not to be interpreted in an idealized or extremely formalized sense, unless expressively so defined herein.

The above is description of the present disclosure, and is not to be considered as a limitation on the present disclosure. Although several exemplary embodiments of the present disclosure are described, a person skilled in the art may easily understand that, changes can be made to the exemplary embodiments without departing from the teachings and advantages of the present disclosure. Therefore, the changes are intended to be included within the scope of the present disclosure. It is to be understood that, the above is description of the present disclosure, and is not to be considered to be limited by the disclosed specific embodiments, and modifications to the disclosed embodiments and other embodiments fall within the scope of the disclosure.

What is claimed is:

1. A method for processing distributed data, the method comprising:
obtaining, by processing circuitry, distributed data of a first main body, the distributed data having a transfer identifier, wherein the distributed data is a blockchain electronic bill belonging to the first main body and the first main body is an individual user, an enterprise, or a service provider; and
transferring, in response to a second main body different from the first main body, the distributed data to a management address based on the transfer identifier when the distributed data meets a first condition, the first condition being that the distributed data includes abnormal transaction information, wherein the second main body is a supervision agency, auditing agency or a bank having a supervision function of the blockchain electronic bill associated with the management address,
wherein the distributed data transferred to the management address corresponds to freezing transfer of the distributed data by the first main body and the second main body performs an in-depth examination for the abnormal transaction; and
when determining that suspicious transaction information is not abnormal transaction information, the second main body may transfer the blockchain electronic bill out of the management address for unfreezing.

2. The method according to claim 1, wherein the transfer identifier of the distributed data is a multi-signature address that is generated based on a first key pair corresponding to the first main body and a second key pair corresponding to the second main body.

3. The method according to claim 2, wherein the multi-signature address is generated based on a public key in the first key pair and a public key in the second key pair.

4. The method according to claim 3, wherein the transferring comprises:
transferring the distributed data to the management address based on the multi-signature address by using a private key in the second key pair.

5. The method according to claim 4, further comprising:
transferring the distributed data to a target address indicated by the first main body, the distributed data being transferred to the target address based on the multi-signature address by using a private key in the first key pair when the distributed data does not meet the first condition.

6. The method according to claim 5, wherein the first condition is determined based on history information.

7. The method according to claim 5, wherein the transfer identifier of the distributed data is a smart contract corresponding to the distributed data.

8. The method according to claim 7, wherein the transferring comprises:
transferring the distributed data to the management address based on the smart contract.

9. The method according to claim 5, further comprising:
transferring the distributed data out of the management address based on the distributed data being determined to meet a second condition,
wherein the transfer of the distributed data out of the management address unfreezes the transfer of the distributed data by the first main body.

10. The method according to claim 5, further comprising:
transferring the distributed data to a target address indicated by the first main body when the distributed data does not meet the first condition.

11. A device for processing distributed data, comprising:
processing circuitry configured to:
obtain the distributed data of a first main body, the distributed data having a transfer identifier, wherein the distributed data is a blockchain electronic bill belonging to the first main body and the first main body is an individual user, an enterprise, or a service provider; and transfer, in response to a second main body different from the first main body, the distributed data to a management address based on the transfer identifier when the distributed data meets a first condition, the first condition being that the distributed data includes abnormal transaction information, wherein the second main body is a supervision agency, auditing agency or a bank having a supervision function of the blockchain electronic bill associated with the management address, wherein the distributed data transferred to the management address corresponds to freezing transfer of the distributed data by the first main body and the second main body performs an in-depth examination for the abnormal transaction; and when determining that suspicious transaction information is not abnormal transaction information, the second main body may transfer the blockchain electronic bill out of the management address for unfreezing.

12. The device according to claim 11, wherein the transfer identifier of the distributed data is a multi-signature address that is generated based on a first key pair corresponding to the first main body and a second key pair corresponding to the second main body.

13. The device according to claim 12, wherein the multi-signature address is generated based on a public key in the first key pair and a public key in the second key pair.

14. The device according to claim 13, wherein the processing circuitry is configured to:
transfer the distributed data to the management address based on the multi-signature address by using a private key in the second key pair.

15. The device according to claim 14, wherein the processing circuitry is configured to:
transfer the distributed data to a target address indicated by the first main body, the distributed data being transferred to the target address based on the multi-signature address by using a private key in the first key pair when the distributed data does not meet the first condition.

16. The device according to claim 11, wherein the first condition is determined based on history information.

17. The device according to claim 11, wherein the transfer identifier of the distributed data is a smart contract corresponding to the distributed data.

18. The device according to claim 17, wherein the processing circuitry is configured to:
transfer the distributed data to the management address based on the smart contract.

19. The device according to claim 11, wherein
the processing circuitry is configured to transfer the distributed data out of the management address based on the distributed data being determined to meet a second condition, and
the transfer of the distributed data out of the management address unfreezes the transfer of the distributed data by the first main body.

20. A non-transitory computer-readable storage medium storing instructions which when executed by a processor cause the processor to perform:
obtaining distributed data of a first main body, the distributed data having a transfer identifier, wherein the distributed data is a blockchain electronic bill belonging to the first main body and the first main body is an individual user, an enterprise, or a service provider; and transferring, in response to a second main body different from the first main body, the distributed data to a management address based on the transfer identifier when the distributed data meets a first condition, the first condition being that the distributed data includes abnormal transaction information, wherein the second main body is a supervision agency, auditing agency or a bank having a supervision function of the blockchain electronic bill associated with the management address, wherein the distributed data transferred to the management address corresponds to freezing transfer of the distributed data by the first main body and the second main body performs an in-depth examination for the abnormal transaction; and when determining that suspicious transaction information is not abnormal transaction information, the second main body may transfer the blockchain electronic bill out of the management address for unfreezing.

\* \* \* \* \*